US010306651B2

(12) United States Patent
Sundström et al.

(10) Patent No.: US 10,306,651 B2
(45) Date of Patent: May 28, 2019

(54) METHOD AND NETWORK NODE FOR SCHEDULING

(71) Applicant: Telefonaktiebolaget LM Ericsson (publ), Stockholm (SE)

(72) Inventors: Lars Sundström, Södra Sandby (SE); Magnus Åström, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 55 days.

(21) Appl. No.: 15/515,182

(22) PCT Filed: Jan. 31, 2017

(86) PCT No.: PCT/EP2017/052024
§ 371 (c)(1),
(2) Date: Mar. 29, 2017

(87) PCT Pub. No.: WO2018/141361
PCT Pub. Date: Aug. 9, 2018

(65) Prior Publication Data
US 2018/0234979 A1    Aug. 16, 2018

(51) Int. Cl.
*H04W 72/08*  (2009.01)
*H04L 1/00*  (2006.01)
(Continued)

(52) U.S. Cl.
CPC ...... *H04W 72/082* (2013.01); *H04B 10/6165* (2013.01); *H04B 15/06* (2013.01);
(Continued)

(58) Field of Classification Search
CPC .... H04W 72/082; H04L 1/0003; H04B 17/18; H04B 10/6165
See application file for complete search history.

(56) References Cited

U.S. PATENT DOCUMENTS

2009/0251370 A1    10/2009   Hohne et al.
2010/0016023 A1*   1/2010   Yamauchi ............ H04L 5/0037
                                                            455/562.1
(Continued)

OTHER PUBLICATIONS

Pitarokoilis, A. et al., "Uplink Performance of Time-Reversal MRC in Massive MIMO Systems Subject to Phase Noise", IEEE Transactions on Wireless Communications, Feb. 2015, pp. 711-723, vol. 14, No. 2.
(Continued)

*Primary Examiner* — Walli Z Butt
(74) *Attorney, Agent, or Firm* — Coats & Bennett, PLLC

(57) ABSTRACT

A method (20) of scheduling performed by a network node (3) is disclosed. The network node (3) comprises a distributed local oscillator architecture in which elements ($18_1$, ..., $18_i$, ..., $18_N$) of an antenna array (14) have at least partly uncorrelated local oscillator signals, and the network node (3) has wireless connectivity to at least two transmitter nodes (2a, 2b). The method (20) comprises calculating (21) a phase noise value between one or more layers received in each element ($18_1$, ..., $18_i$, ..., $18_N$) from a first transmitter node (2a) and one or more layers received in each element ($18_1$, ..., $18_i$, ..., $18_N$) from a second transmitter node (2b), and determining (22) a scheduling allocation for the at least two transmitter nodes (2a, 2b), taking the calculated phase noise value into account. A network node (3), computer program and computer program product are also provided.

17 Claims, 4 Drawing Sheets

(51) Int. Cl.
*H04B 10/61* (2013.01)
*H04B 17/18* (2015.01)
*H04B 15/06* (2006.01)
*H04B 17/318* (2015.01)
*H04W 52/24* (2009.01)

(52) U.S. Cl.
CPC ........... *H04B 17/18* (2015.01); *H04B 17/318* (2015.01); *H04L 1/0003* (2013.01); *H04W 52/244* (2013.01)

(56) References Cited

U.S. PATENT DOCUMENTS

| | | | | |
|---|---|---|---|---|
| 2014/0056156 | A1* | 2/2014 | Jongren | H04L 1/0026 370/252 |
| 2017/0280444 | A1* | 9/2017 | Da Silva | H04L 5/0048 |
| 2018/0123652 | A1* | 5/2018 | Ko | H04L 25/02 |

OTHER PUBLICATIONS

Samsung, "Time and frequency pattern for PTRS", 3GPP TSG RAN WG1 NR Ad Hoc, Jan. 16-20, 2017, pp. 1-5, Spokane, WA, US, R1-1700932.

\* cited by examiner

METHOD AND NETWORK NODE FOR SCHEDULING

TECHNICAL FIELD

The technology disclosed herein relates generally to the field of wireless communications, and in particular to a method for scheduling, a network node, computer program and computer program product.

BACKGROUND

In order to increase capacity and coverage for future 5G communication systems massive Multiple Input Multiple Output (MIMO) technology, small cells as well as more spectrum are some of the most promising means. Antenna array systems will be a ubiquitous component in such forthcoming 5G systems as a means of improving capacity for the presently used low GHz frequencies but also for ensuring sufficient coverage as the operating frequency extends to the mmW range. Antenna arrays may be used for simultaneously transmitting or receiving multiple layers, e.g. through multiple beams in the special case of line-of-sight (LOS) communication or more generally through the concept of Multi-User MIMO (MU-MIMO).

Uplink transmissions in cellular systems are typically controlled by an access node, in the following exemplified by an eNB. Based on, e.g., communicated transmission needs, channel properties and some measure of fairness, the eNB allocates the resources of a physical uplink shared channel (PUSCH) to the competing transmitter devices, in the following exemplified by user equipment (UEs). In case of a high load the eNB may choose to schedule a MU-MIMO transmission such that multiple UEs transmit in the same time-frequency resource. Since such scheduling increases noise, e.g., from interference from other transmissions (or layers) using the same time frequency resource, typically only transmitters with suitable transmission properties (i.e., weakly correlated channels) are selected. Non-orthogonal scheduling techniques have been proposed wherein a strong received signal is combined with a weak received signal whereby the strong signal is (presumably correctly) decoded and then recoded and subtracted from the jointly received signal after which the weak signal may be decoded.

In an antenna array system (AAS) receiver architecture with a common local oscillator generation, signals from all antenna elements are downconverted using the same LO-signal with the same phase noise. In an AAS receiver architecture with a distributed local oscillator generation, all antenna element signals are downconverted using different, i.e. uncorrelated or at least partly uncorrelated LO-signals.

SUMMARY

For the case of a single layer, the distributed LO signal generation gives a highly improved signal-to-noise ratio (SNR) (SNR attributed to the LO phase noise) compared to the common LO signal generation.

However, although the distributed LO generation has a more favorable SNR than the common LO signal generation, for the case of multiple layers there is an SNR penalty associated with interlayer leakage (or interference) due to phase noise, which significantly reduces the benefits of distributed LO signal generation. This drawback is worsened for scenarios wherein one or more aggressor layers have a larger power compared to a given victim layer. For example, from the perspective of the eNB this will occur when power control of UEs is not enough to mitigate power differences between layers associated with a respective UE. There may be UEs from which the received signal powers vary significantly, and hence the interlayer leakage due to phase noise of the stronger signal may significantly impact the performance of the weaker signal.

In view of the above there is a need for providing improved control in presence of the above described phase noise in multilayer scenarios, in particular in distributed local oscillator signal generation.

An objective of the present disclosure is to address and improve various aspects for multilayer scenarios in which distributed local oscillator signal generation is used. A particular objective is to provide a scheduling algorithm that accounts for the above problem such that the effect from phase noise on received layers is minimized. This objective and others are achieved by the methods, devices, computer programs and computer program products according to the appended independent claims, and by the embodiments according to the dependent claims.

The objective is according to an aspect achieved by a method of scheduling performed by a network node comprising a distributed local oscillator architecture in which elements of an antenna array have uncorrelated or at least partly uncorrelated local oscillator signals. The network node has wireless connectivity to at least two transmitter nodes. The method comprises calculating a phase noise value between one or more layers received in each element from a first transmitter node and one or more layers received in each element from a second transmitter node, and determining a scheduling allocation for the at least two transmitter nodes, taking the calculated phase noise value into account. The phase noise value is a measure on the phase noise induced interlayer interference.

The method provides several advantages. For instance, compared to known methods the disclosed method gives an increased accuracy in the signal-to-noise ratio estimate when using a distributed local oscillator architecture. This in turn enables an improved wireless connection to e.g. user devices and also an improved system performance since use of a more accurate scheduling is enabled. The benefits of distributed local oscillator generation can be, e.g., closeness of the local oscillators to the conversion stages of signals, thus reducing distribution losses compared to a common local oscillator signal generation, and also reducing risk of interference from other parts of the transceiver polluting the local oscillator signal.

The objective is according to an aspect achieved by a computer program for a network node, the computer program comprising computer program code, which, when run on at processing circuitry of the network node causes the network node to perform the as above.

The objective is according to an aspect achieved by a computer program product comprising a computer program as above and a computer readable means on which the computer program is stored.

The objective is according to an aspect achieved by a network node comprising a distributed local oscillator architecture in which elements of an antenna array use uncorrelated or at least partly uncorrelated local oscillator signals. The network node is arranged for wireless connectivity to at least two transmitter nodes. The network node is configured to calculate a phase noise value between one or more layers received in each element from a first transmitter node and one or more layers received in each element from a second transmitter node, and to determine a scheduling allocation for the at least two transmitter nodes, taking the calculated phase noise value into account.

Further features and advantages of the embodiments of the present teachings will become clear upon reading the following description and the accompanying drawings.

DETAILED DESCRIPTION

Figure 1:
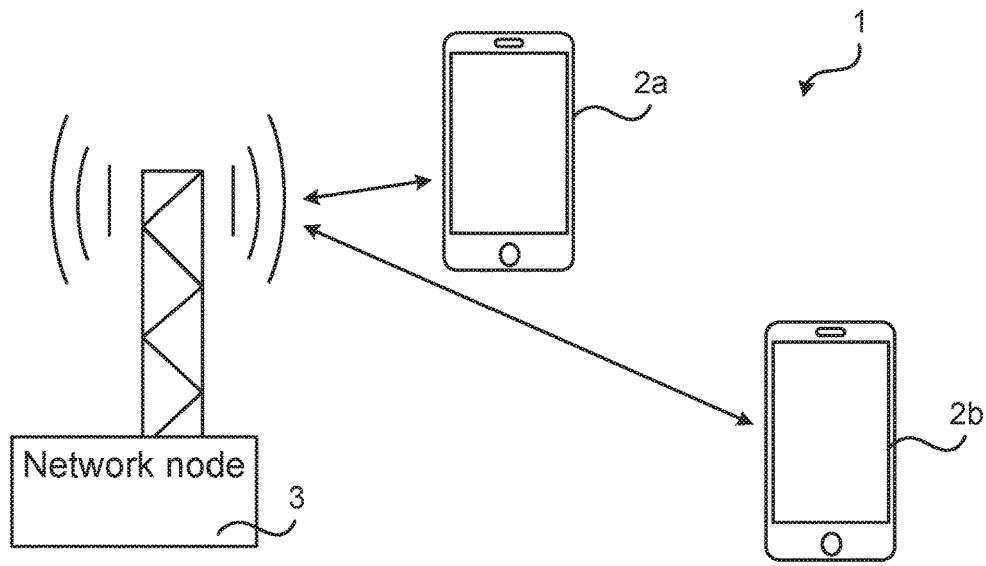
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As a note on vocabulary, an antenna array typically comprises a regular structure of equi-spaced antenna elements and/or sub-arrays of antenna elements. The single antenna element or sub-array of antenna elements that is connected to a respective transceiver is in the following referred to as element.

Antenna arrays thus comprise multiple elements and may be used for simultaneously transmitting or receiving multiple layers, e.g. through multiple beams in the special case of line-of-sight (LOS) communication or more generally through the concept of MU-MIMO, as mentioned in the background section. On a transmitting side (e.g. UE) each layer is associated with a set of combining (precoding) weights where, in turn, each weight is associated with an element (which may thus be a single antenna element or a sub-array of antenna elements). Correspondingly, on a receiving side (e.g. eNB) each layer is associated with another set of weights in order to resolve and distinguish the different layers. In a more general case each weight may be replaced by multiple taps (impulse response) to handle channel dispersion.

In the following $s_1=[s_{1,1}\ s_{1,2}\ \ldots\ s_{1,N}]^T$ and $s_2=[s_{2,1}\ s_{2,2}\ \ldots\ s_{2,N}]^T$ are first and second received layers as observed at each element in an N element array.

The total signal as observed at the elements is $s=s_1+s_2$

Furthermore, in the receiver side there is a first and second set of weights, $w_1=[w_{1,1}\ w_{1,2}\ \ldots\ w_{1,N}]^T$ and $w_2=[w_{2,1}\ w_{2,2}\ \ldots\ w_{2,N}]^T$, associated with first layer and second layer, respectively.

$r_1=w_1^T s_1$ is the received symbol of the first layer and $r_2=w_2^T s_2$ is the received symbol of the second layer. Assuming $w_2^T s_1=0$ and $w_1^T s_2=0$, i.e. with perfect weights the two layers are orthogonal.

Next, phase noise for the cases of common LO generation and for the case of distributed LO generation, respectively, are described more in detail.

In an active antenna system (AAS) receiver architecture with a common LO signal generation, signals received at all elements are downconverted using the same LO signal, and consequently with the same phase noise. The complex baseband equivalent phase noise of the common LO may be modelled with a scalar $p_c=e^{j\varphi_c}\approx 1+j\varphi_c$ where subscript c denotes common LO. The received symbol of the first layer in presence of phase noise equals $$\hat{r}_1=w_1^T s_1 p_c = w_1^T s_1 (1+j\varphi_c) = r_1+j\varphi_c r_1 = r_1+d_{1,c}$$

For zero-mean $r_1$ and $\varphi_c$, the SNR attributed to the common LO phase noise may be calculated as $$SNR_c = \frac{E[r_1 r_1^*]}{E[d_{1,c} d_{1,c}^*]} = \frac{E[r_1 r_1^*]}{E[r_1 r_1^*]E[\varphi_c^2]} = \frac{1}{E[\varphi_c^2]},$$

wherein $d_{1,c}$ is the common LO phase noise effect and E represents the expectation operator.

In an AAS receiver architecture with a distributed LO signal generation, signals received at all elements are downconverted using uncorrelated or at least partly uncorrelated LO signals. The complex baseband equivalent phase noise of the distributed LO can be represented by a vector $p_k$, the $k^{th}$ element of which is described as $$p_k=e^{j\varphi_k}\approx 1+j\varphi_k$$

or in vector form:

$$p=e^{j\varphi}\approx 1+j\varphi$$

Thus for a single received layer we have $$\hat{r}_1=(w_1 \circ p)^T s_1 = (w_1+jw_1\varphi)^T s_1 = r_1+j(w_1\varphi)^T s_1 = r_1+d_{1,d}$$

where "∘" is the element-wise matrix multiplication and subscript d denotes distributed LO phase noise.

The SNR attributed to the distributed LO phase noise term $d_{1,d}$ may be calculated as $$SNR_d = \frac{E[r_1 r_1^*]}{E[d_{1,d} d_{1,d}^*]}$$

Furthermore, assuming $E[\varphi_k^2]=E[\varphi_c^2]$ (i.e. the LO generation for each element has the same average phase noise power as for the common LO generation) and $w_{1,i}s_{1,i}=w_{1,j}s_{1,j}$ we have $$E[d_{1,d} d_{1,d}^*] = \sum_{k=1}^{N} E[|w_{1,k} s_{1,k} j\varphi_k|^2] = E[\varphi_c^2]\sum_{k=1}^{N} E[|w_{1,k} s_{1,k}|^2] = E[\varphi_c^2]\frac{E[r_1 r_1^*]}{N}$$

Thus, the SNR becomes $$SNR_d = \frac{N}{E[\varphi_c^2]}$$

This is an N-fold improvement compared to the common LO approach and this is one of the benefits of using distributed LO generation. It can be used to improve phase noise beyond what is possible to achieve using a single common LO or it can be used to relax the phase noise requirements and thus the power consumption of the distributed LO generation.

Next, the problem mentioned in the summary section is elaborated on, i.e. the herein identified drawback of the distributed LO generation having a reduced performance when several layers are involved.

Returning to the above described case with a distributed LO generation, but now with a victim layer $s_1$ in presence of an aggressor layer $s_2$, the received symbol of the first layer is given by:

$$\hat{r}_1 = (w_1 \cdot p)^T (s_1 + s_2)$$
$$= (w_1 \cdot p)^T s_1 + (w_1 \cdot p)^T s_2$$
$$= (w_{1,k} + w_{1,k} j\varphi_k)_k^T s_1 + (w_{1,k} + w_{1,k} j\varphi_k)_k^T s_2$$
$$= r_1 + (w_{1,k} j\varphi_k)_k^T s_1 + w_1^T s_2 + (w_{1,k} j\varphi_k)_k^T s_2$$
$$= r_1 + (w_{1,k} j\varphi_k)_k^T s_1 + (w_{1,k} j\varphi_k)_k^T s_2$$

Generalized to an arbitrary number of layers M:

$$\hat{r}_1 = r_1 + (w_{1,k} j\varphi_k)_k^T s_1 + \sum_{m=2}^{M} (w_{1,k} j\varphi_k)_k^T s_m = r_1 + d_{1,d} + \sum_{m=2}^{M} d_{m,d}$$

There are now three terms: the desired term ($r_1$), the previously calculated intra-layer phase noise term ($d_{1,d}$), and the interlayer phase noise term ($\Sigma_{m=2}^M d_{m,d}$).

Turning to the SNR attributed to the interlayer phase noise contribution:

$$E[d_{m,d} d_{m,d}^*] = \sum_{k=1}^{N} E[|w_{1,k} s_{m,k} j\varphi_k|^2] = E[\varphi_c^2] \sum_{k=1}^{N} E[|w_{1,k} s_{m,k}|^2]$$

Now, for an arbitrary number N of elements, assuming a ratio $G_m$ between the sum of powers of the individual weighted terms of the victim layer to the sum of powers of the individual weighted terms of an aggressor layer $s_m$:

$$G_m \sum_{k=1}^{N} E[|w_{1,k} s_{1,k}|^2] = \sum_{k=1}^{N} E[|w_{1,k} s_{m,k}|^2]$$

This yields $$G_m \sum_{k=1}^{N} E[|w_{1,k} s_{1,k}|^2] = \sum_{k=1}^{N} E[|w_{1,k} s_{m,k}|^2]$$

And therefore $$SNR = \frac{N}{E[\varphi_c^2] \cdot \sum_{m=2}^{M} G_m}$$

For the special case of $G_m=1$ (all layers having the same power):

$$SNR = \frac{N}{E[\varphi_c^2] \cdot M}$$

For example, with N=64 elements and M=8 layers the net gain in SNR is now only 9 dB.

In other words, the penalty associated with multiple layers significantly reduces the benefits of distributed LO generation.

As noted in the background section, the problem will worsen for scenarios when there is one or more aggressor layers that have a larger power levels compared to a given victim layer. For example, from the perspective of an eNB this will occur when power control of UEs is not enough to mitigate power differences between layers associated with respective UE, i.e. the layers received at the elements have large power differences. Hence there is a need for a scheduling algorithm that considers the above problem such that the effect from phase noise on received layers is minimized.

FIG. 1 illustrates a communication system 1 in which the above described situation might occur. The communications system 1 (e.g. 3G, 4G or 5G system) comprises a wireless access network comprising at least one network node 3 serving communications devices 2a, 2b, in the following also denoted transmitting devices 2a, 2b and exemplified by user equipment (UE) 2a, 2b. The communications system 1 may also comprise a core network handling e.g. subscription issues, mobility etc. The core network in turn is connected to external data networks such as Internet, cloud computing environments etc. and provides UEs access to these data networks. A first transmitting device 2a and a second transmitting device 2b, in the following exemplified by a user operated device, e.g. a user equipment (UE) 2a, 2b are shown. It is however noted that the transmitting device 2a, 2b may be any type of wireless device with a wireless connectivity to a network node 3 of a communication system 1. The network node 3 serves the UEs 2a, 2b by providing them with one or more wireless links, e.g. radio frequency links. The network node 3 may receive signals on multiple layers from e.g. a first UE 2a having multiple transmit antennas (SU-MIMO) and/or the network node 3 may receive signals on multiple layers from the first and a second UEs 2a, 2b (MU-MIMO).

In Long Term Evolution (UTE), scheduling requests are typically transmitted by the UE on the physical uplink control channel (PUCCH). Each UE has a dedicated scheduling-request resource every few subframes. The network node 3 performing the scheduling (in LTE, for instance, the scheduling is performed by an eNB, or gNB in 5G) replies with a scheduling grant in the physical downlink control channel (PDCCH). In the scheduling grant information on a UE's allocated transmission resources are conveyed together with transmission parameters such as Modulation and Coding Scheme (MCS), rank and precoder index. In LTE, there are predefined modulation and coding schemes: MCS-1 to MCS-13 defining e.g. MCS 3=QPSK 1/4 (Quadrature phase-shift keying, coding rate 1/4) and MCS 13=64 QAM 4/5 (Quadrature amplitude modulation, coding rate 4/5). When performing the scheduling allocation, the network node 3 may also consider already assigned transmission grants. For example, a standard voice connection may be setup as a transmission grant allowing a few periodic transmissions using a few resource blocks every 20 subframes whereas a high-definition video feed may require multiple resource blocks every subframe.

In the communications system 1, the UEs typically have different power levels depending on e.g. their particular radio conditions. In the illustrated case, the first UE 2a is closer to the network node 3 than the second UE 2b and the network node 3 may have a higher receive power level for layer(s) from the first UE 2a than for layer(s) from the second UE 2b.

The transmission (one or multiple layers) from the first UE 2a may interfere with the transmission (one or multiple layers) from the second UE 2b. The network node 3 may perform power control on these transmissions, such as to reduce the interference and provide both UEs 2a, 2b best possible links (e.g. in terms of MCS, rank and precoder). However, as noted earlier, the power control of the UEs might not be enough. In the illustrated case, the layer(s) of the first UE 2a can be seen as the aggressor layer(s) as the receive power thereof in the network node 3 is higher than the receive power of the victim layer(s) of the second UE 2b. The above-described phase noise induced interlayer interference affects the victim layer(s). In the illustrated case, the phase noise of a first (stronger) signal from the first UE 2a may significantly impact the performance of a second (weaker) signal from the second UE 2b.

The present teachings address such cases by providing a scheduling algorithm that minimizes the effect from phase noise on layers received in the network node 3. That is, the scheduling is made in view of minimizing phase noise between the received layers.

Briefly, methods and means are provided for a scheduling that reduces the effects of phase noise. In some embodiments, weaker layer(s) are scheduled separately from stronger layer(s). Such transmitter pairs, (wherein one transmitter has weaker layers and another stronger layers), may be scheduled separately in the time or frequency domain, since in that case the inter layer distortion is eliminated, whereas they should be separated in the spatial domain when the level of interlayer distortion is acceptable.

The present teachings provide, in various embodiments, a scheduling method in a network node for uplink scheduling of transmitter devices. The scheduling method is advantageous in, for instance, cases wherein the received signal powers of signals from transmitter devices vary significantly, and hence the phase noise of the stronger signal may significantly impact the performance of the weaker signal.

Figure 2:
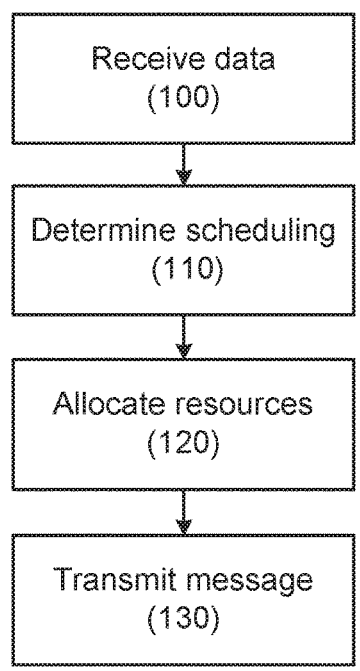
FIG. 2 is a flow chart over various embodiments according to the present teachings.

FIG. 2 presents a flow chart of an embodiment of the invention. It is noted that although LTE is used as an exemplary standard for wireless communication, the present teachings are not limited thereto. Forthcoming standards may also benefit from the present teachings. For instance, the methods and devices disclosed herein may be implemented also for a forthcoming LTE standard together with a new radio access technology.

In box 100, of the embodiment shown in FIG. 2, the network node 3 receives scheduling requests or has active scheduling grants from one or multiple UEs 2a, 2b. Such a request is typically transmitted by the UE 2a, 2b on the PUCCH, as described earlier.

Based on these scheduling requests, and possibly other information, the network node 3 determines a preferred scheduling allocation (indicated in box no) for the UEs 2a, 2b from which it has received scheduling requests.

Starting with the expressions given earlier, and also including additive Gaussian noise term $e \in N(0, \sigma^2)$, the received symbol of layer 1 can be expressed as:

$$\hat{r}_1 = (w_1 \cdot p)^T \left( \sum_{k=1}^{K} s_k + e \right)$$

Replacing the element wise multiplication $\varphi_{w_k} = w_k \circ \varphi$, the above expression for a general layer k becomes:

$$\hat{r}_k = w_k^T \left( \sum_{l=1}^{M} s_l \right) + j\varphi_{w_k}^T \left( \sum_{l=1}^{M} s_l \right) + w_k^T e + j\varphi_{w_k}^T e,$$

where the first term represents signal energy (from layer k) and interlayer interference (from remaining layers $l \neq k$), the second term is the interlayer interference due to phase noise, the third term is the Gaussian noise and the last term is phase noise translated Gaussian noise. It is noted that the interlayer interference of the first term is different from the interlayer interference due to phase noise. The interlayer interference of the first term would be zero in case of perfectly orthogonal layers. Hence, the total SNR may be expressed as $$SNR_k = \frac{E\{r_k r_k^H\}}{E\left\{ \left( w_k^T \left( \sum_{l=1, l \neq k}^{M} s_l \right) + j\varphi_{w_k}^T \left( \sum_{l=1}^{M} s_k \right) + w_k^T e + j\varphi_{w_k}^T e \right)^T \left( w_k^T \left( \sum_{l=1, l \neq k}^{M} s_l \right) + j\varphi_{w_k}^T \left( \sum_{l=1}^{M} s_l \right) + w_k^T e + j\varphi_{w_k}^T e \right) \right\}},$$

wherein H represents the Hermitian conjugate. Assuming orthogonal noise components, this expression may be further simplified into a matrix formulation:

$$SNR_k = \frac{E\{r_k r_k^H\}}{E\{(Sw_k)^H S w_k\} - E\{r_k r_k^H\} + E\{(S\varphi_{w_k})^H S\varphi_{w_k}\} + w_k^T w_k \frac{\sigma^2}{N}},$$

where $S = [s_1 \ldots s_M]^T$. In the denominator above, the third term $(E\{(s\varphi_{w_k})^H S\varphi_{w_k}\})$ depends on the phase noise (also denoted phase noise value herein).

The network node 3 may now determine MCS by first determining the corresponding mutual information (MI, mutual information between the transmitted and received modulation symbols) and also considering allowed modulation schemes and from that determining the channel efficiency.

As an example on the above, assume that a preferred scheduling would be a two-layer transmission. The transmission from the first UE 2a may, for instance, have MCS 13 and the transmission from the second UE 2b may, for instance, have MCS 3, wherein the MCS values are determined without considering the herein described effect of phase noise. However, when adding the interlayer induced phase noise this scheduling may no longer be optimal, i.e. it may no longer be the preferred one, since when indeed considering the interlayer induced phase noise only MCS 1 may be scheduled for the second layer (UE 2b). Then a TDMA or FDMA may be preferable such that the first UE 2a is scheduled with MCS 14 and the second UE 2b is scheduled with MCS 5 in different resource blocks. This would thus improve the MCS for both UEs.

In other embodiments, two scheduled blocks are altered (active scheduling grants are changed). For instance, in a first scheduled block the first UE 2a is scheduled with MCS 13 and the second UE 2b is scheduled with MCS 3, and in a second block, the first UE 2a is scheduled with MCS 11 and the second UE 2b is scheduled MCS 5. In these embodiments, these two scheduled blocks are altered such that one block is instead scheduled with MCS 13 and MCS 11 and the other block is scheduled with MCS 3 and 5. However, this assumes that the different channels (layers) are sufficiently orthogonal to be combined in arbitrary ways.

In one embodiment the allocation is performed such that UEs 2a, 2b with large differences in the received signal strength are scheduled in different time resources, whereas in another embodiment they may be scheduled in different frequency resources. In a further embodiment, UEs with similar received signal strengths are scheduled in the same time-frequency resource element although with different spatial precoders. Furthermore, in another embodiment, a SU-MIMO transmission may be adjusted such that a lower MCS is scheduled on the weaker layer in order to take into consideration the effect of phase noise when receiving. This is a straightforward operation using the added noise as described above, and conventional SNR-to-MCS mapping. Correspondingly, the rank may be affected in a SU-MIMO transmission such that the weaker layer is omitted in its entirety. In yet further embodiments, other information such as channel information or a fairness parameter may also affect the scheduling decision.

Having determined the scheduling, the network node 3 allocates the corresponding resources (indicated at box 120) in a physical downlink control channel (PDCCH) message, instructing respective UE 2a, 2b to transmit according to the determined scheduling.

Finally, the network node 3 transmits the PDCCH message (indicated at box 130).

The various embodiments and features that have been described may be combined in many different ways, examples of which are given in the following.

Figure 3A:
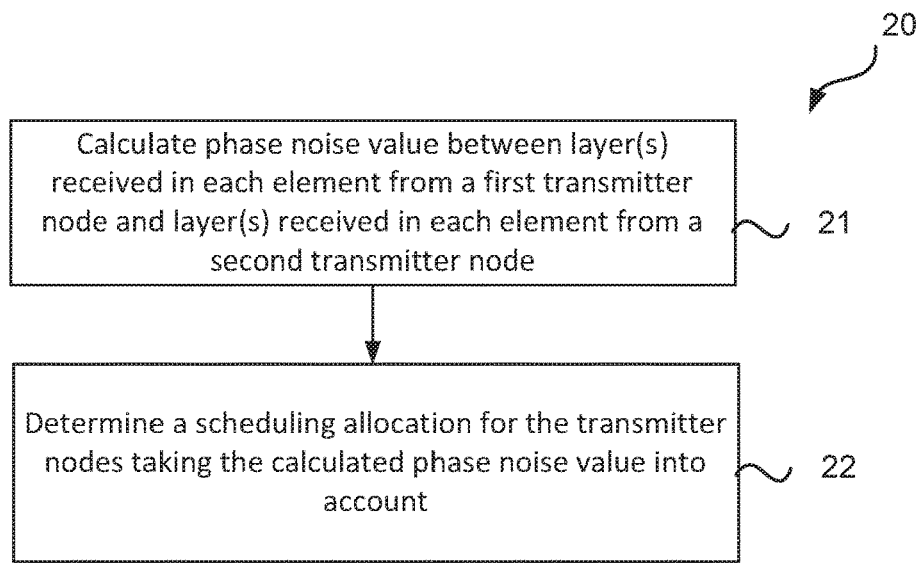
FIGS. 3a and 3b illustrate flow charts over steps of embodiments of a method in a network node in accordance with the present teachings.

FIG. 3a illustrates a flow chart over steps of an embodiment of a method in a network node in accordance with the present teachings.

A method 20 of scheduling performed by a network node 3 is provided. The network node 3 comprises a distributed local oscillator architecture in which elements $18_1, \ldots, 18_i, \ldots, 18_N$ of an antenna array 14 have uncorrelated or at least partly uncorrelated local oscillator signals. The network node 3 has wireless connectivity to at least two transmitter nodes 2a, 2b. That is, the network node 3 may be receiving multiple layers of data from multiple transmitter nodes, but at least one respective layer from two transmitter nodes (e.g. UEs).

The method 20 comprises calculating 21 a phase noise value between one or more layers received in each element $18_1, \ldots, 18_i, \ldots, 18_N$ from a first transmitter node 2a and one or more layers received in each element $18_1, \ldots, 18_i, \ldots, 18_N$ from a second transmitter node 2b. That is, each element $18_1, \ldots, 18_i, \ldots, 18_N$ of an antenna array 14 (which may be part of an active antenna system) of the network node 3 or connected to the network node 3 receives one or more layers from each of the at least two transmitter nodes 2a, 2b. The term "phase noise value" is used herein as a measure on the impact of the phase noise when the local oscillator is applied. Stated differently, the phase noise value may be seen as a measure on the phase noise induced interlayer interference.

The method 20 comprises determining 22 a scheduling allocation for the at least two transmitter nodes 2a, 2b, taking the calculated phase noise value into account.

The network node 3 (or receiving node 3) implements a distributed local oscillator signal architecture. That is, the network node 3 has a separate local oscillator for each element, wherein the element may be a single antenna element or a sub-array comprising several such single antenna arrays. Stated differently, a signal received at an element is downconverted using its own LO-signal.

It is noted that the method 20 may also be implemented in a distributed manner, wherein some of the steps are performed in the network node 3, while other steps are performed in e.g. a cloud environment (e.g. a server thereof). For instance, the calculating 21 may be performed in a cloud environment server based on input provided by the network node 3.

The method 20 provides a number of advantages. An advantage is a more accurate signal-to-noise ratio at the receiver from phase noise mitigation arising from a distributed local oscillator generation. This, in turn, will result in improved communications link and system performance while preserving benefits of using distributed LO generation.

In an embodiment (also described with reference to FIG. 3b), the method 20 comprises:
  allocating 23 transmission resources for the at least two transmitter nodes 2a, 2b according to the determined scheduling allocation, and
  transmitting 24 a message to the at least two transmitter node 2a, 2b, the message indicating the allocated transmission resources.

In various embodiments, the method comprises changing, based on the determining 22, a set of scheduling grants by changing one or more of: modulation and coding scheme, resource allocation, rank and precoder. For instance, in some embodiments, the modulation and coding scheme of the weaker layer is decreased in a MU-MIMO transmission. In other embodiments, the rank is decreased in a MU-MIMO transmission.

In various embodiments, the calculating 21 comprises calculating a phase noise value as part of a signal-to-noise interference, SNR, calculation, the SNR calculation comprising:

$$SNR_k = \frac{E\{r_k r_k^H\}}{E\{(Sw_k)^H Sw_k\} - E\{r_k r_k^H\} + E\{(S\varphi_{w_k})^H S\varphi_{w_k}\} + w_k^T w_k \frac{\sigma^2}{N}},$$

wherein $r_k$ is the received symbol of layer k, S is a matrix of received layers, $w_k$ is a set of combining weights for layer k, N is the number of elements used for reception. The arrival at the above equation has been described earlier.

In various embodiments, the distributed local oscillator architecture comprises N local oscillators, and the phase noise value comprises phase noise attributed to uncorrelated or partly uncorrelated phase noise contributions of the N local oscillators.

In various embodiments, the method 20 comprises, before the calculating, receiving scheduling requests from the at least two transmitter nodes 2a, 2b.

In some embodiments, the method 20 is performed on a need basis. In such embodiments, the determining 22 the scheduling allocation may be performed when scheduling two transmitter nodes 2a, 2b for which a difference in received signal strengths, assuming a logarithmic representation (i.e. difference measured in dB), exceeds a defined first threshold value.

The scheduling allocation may then comprise scheduling the transmitter nodes 2a, 2b in different time resources. In other embodiments, the transmitter nodes 2a, 2b are instead scheduled in different frequency resources.

That is, in some embodiments, the method 20 comprises scheduling the two transmitter nodes 2a, 2b for which a difference in received signal strengths exceeds the defined first threshold value, in different frequency resources or in different time resources.

In other embodiments, the method 20 is performed when scheduling two transmitter nodes 2a, 2b for which a difference (in dB) in received signal strengths is less than a defined second threshold value. The scheduling allocation may then comprise scheduling the transmitter nodes 2a, 2b in same time and frequency resource, with different spatial precoders.

The method 20 may hence comprise separating in time the allocation between transmitter nodes 2a, 2b, which have a large difference in received power. In other embodiments, the method 20 may comprise separating in frequency the allocation between transmitter nodes 2a, 2b, which have a large difference in received power. In still other embodiments, the method 20 may comprise separating spatially in the same time-frequency resource the allocation between transmitter nodes 2a, 2b, which have a small difference in received power.

That is, in some embodiments, the determining 22 the scheduling allocation is performed when scheduling two transmitter nodes 2a, 2b for which a difference in received signal strengths is less than a defined second threshold value, and the method 20 comprises scheduling the two transmitter nodes 2a, 2b in same time and frequency resource, with different spatial precoders.

Figure 3B:
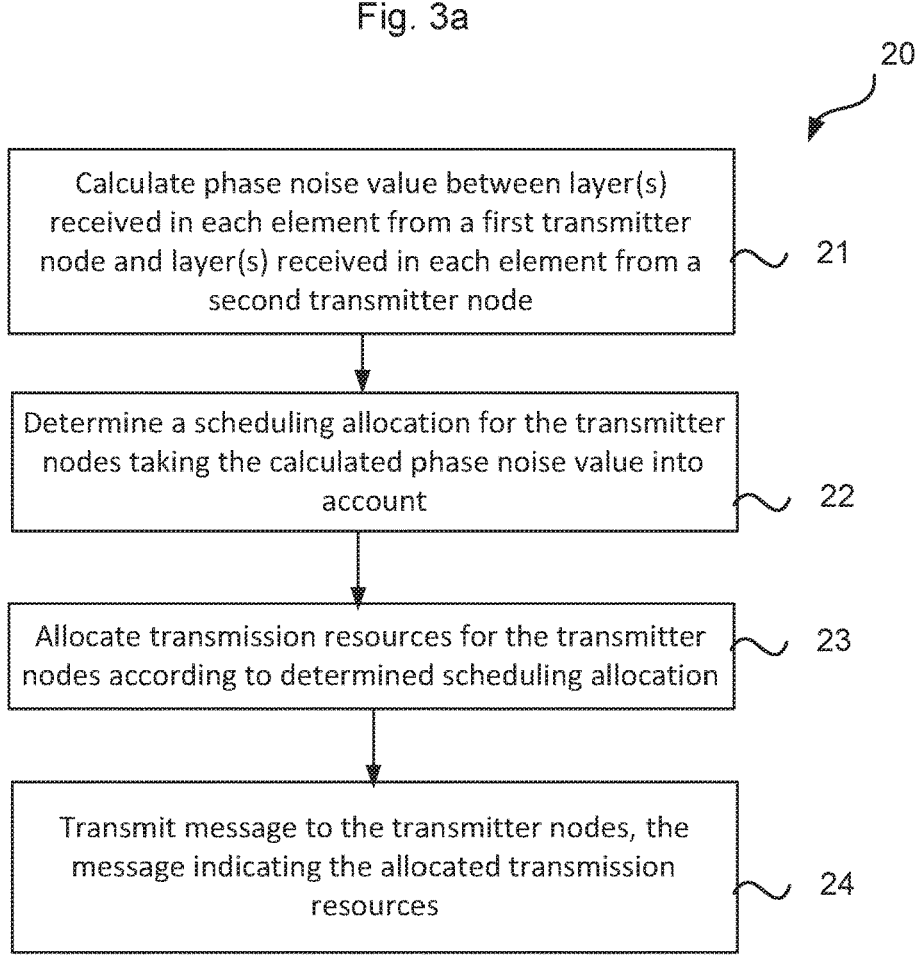

FIG. 3b illustrates a flow chart over steps of an embodiment of a method in a network node in accordance with the present teachings. Steps 21 and 22 are identical to the steps described with reference to FIG. 4a, and the description thereof is not repeated here. When the scheduling allocation for the transmitter nodes 2a, 2b has been determined, transmission resources are allocated 23 for the transmitter nodes 2a, 2b in accordance with the determined scheduling allocation. The network node 3 then transmits 24 a message to the transmitter nodes 2a, 2b informing them about the allocated transmission resources.

Figure 4:
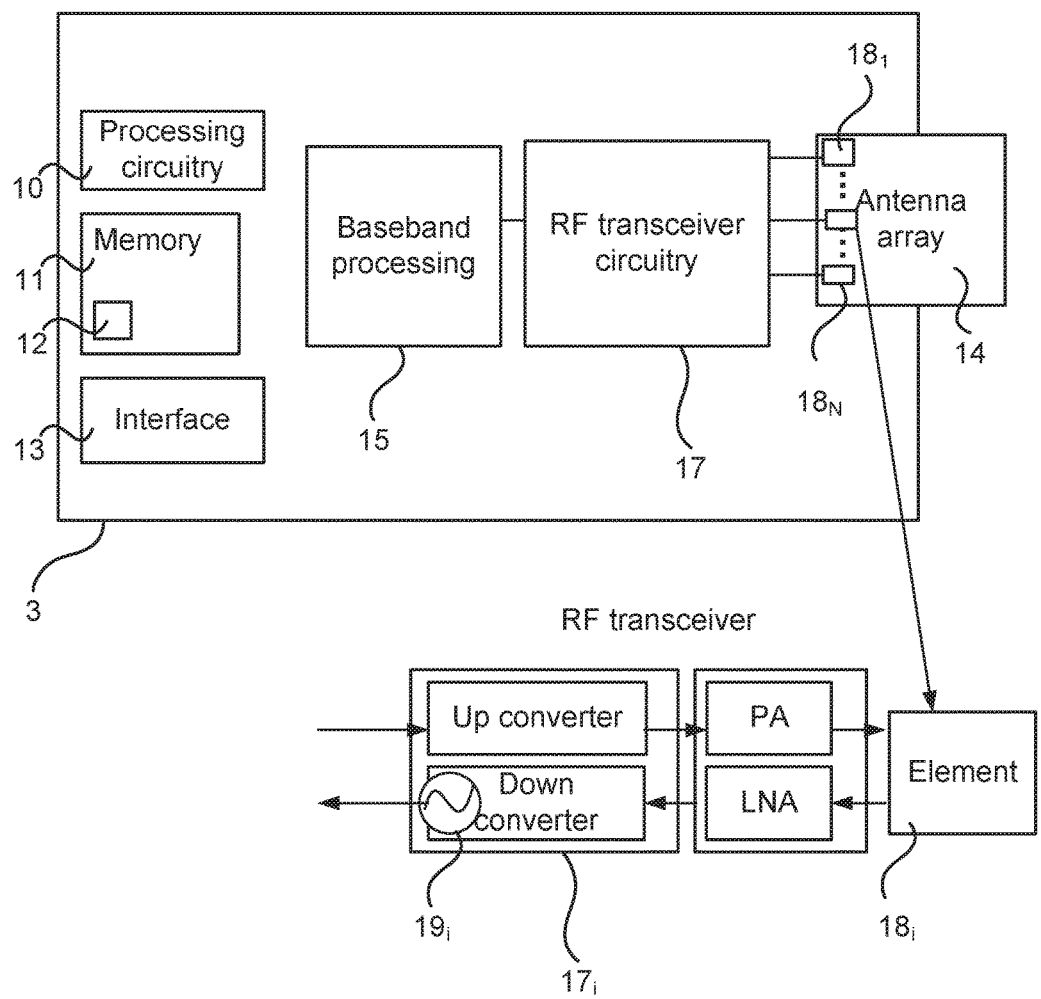
FIG. 4 illustrates schematically a network node and means for implementing embodiments in accordance with the present teachings.

FIG. 4 illustrates a network node 3 and means for implementing embodiments in accordance with the present teachings. The network node 3 may, for instance, be an eNB or other type of radio access network node. The network node 3 provides wireless connectivity for e.g. UEs 2a, 2b. To this end, the network node 3 comprises or is connected to one or more antenna arrays 14. Each antenna array 14 comprises a number of elements $18_1, \ldots, 18_N$, wherein each element is a sub-array of elements or a single antenna element. Each element is connected to a respective transceiver as described earlier and as illustrated in FIG. 4. The antenna array 14 may be part of or be an active antenna system.

An i:th element $18_i$ is thus connected to RF transceiver circuitry 17, comprising e.g. low noise amplifiers, power amplifiers, filters, and/or analog to digital converters etc. The figure illustrates a downconversion stage $17_i$ (uplink), in turn comprising e.g. a local oscillator $19_i$ and a mixer (not shown) and an upconversion stage (downlink).

In FIG. 4, a baseband processing stage 15 is also indicated, which may comprise demodulators (uplink) and modulators (downlink). The details of such stage are not important for the present teachings and are therefore omitted. The present teachings is mainly related to the reception of multiple layers and hence the downconversion stage, wherein a distributed LO signal generation is utilized.

The network node 3 comprises processing circuitry 10 which may be any combination of one or more of a suitable central processing unit (CPU), multiprocessor, microcontroller, digital signal processor (DSP), etc., capable of executing software instructions stored in a computer program product 11, e.g. in the form of a storage medium 11. The processing circuitry to may further be provided as at least one application specific integrated circuit (ASIC), or field programmable gate array (FPGA).

The processing circuitry 10 is configured to cause the network node 3 to perform a set of operations, or steps, e.g. as described in relation to FIGS. 2, 4a and 4b. For example, the storage medium 11 may store the set of operations, and the processing circuitry 10 may be configured to retrieve the set of operations from the storage medium 11 to cause the network node 3 to perform the set of operations. The set of operations may be provided as a set of executable instructions. The processing circuitry 10 is thereby arranged to execute the method in its various embodiments as disclosed herein.

The storage medium 11 may also comprise persistent storage, which, for example, can be any single one or combination of magnetic memory, optical memory, solid state memory or even remotely mounted memory.

The network node 3 may further comprise an interface 13 for communications with e.g. other network nodes (e.g. using an interface for a wired connection) and UEs 2a, 2b (e.g. using an interface for a wireless connection). The communications interface 13 may thus comprise one or more input/output devices and/or a protocol stack for communication with other devices or entities. The interface 13 may be used for receiving data input and for outputting data.

A network node 3 is provided for scheduling of multilayer transmissions. The network node 3 comprises a distributed local oscillator architecture in which elements $18_1, \ldots, 18_i, \ldots, 18_N$ of an antenna array 14 use uncorrelated or at least partly uncorrelated local oscillator signals. The network node 3 is arranged for wireless connectivity to at least two transmitter nodes 2a, 2b. The network node 3 is configured to:

calculate a phase noise value between one or more layers received in each element $18_1, \ldots, 18_i, \ldots, 18_N$ from a first transmitter node 2a and one or more layers received in each element $18_1, \ldots, 18_i, \ldots, 18_N$ from a second transmitter node 2b, and determine a scheduling allocation for the at least two transmitter nodes 2a, 2b, taking the calculated phase noise value into account.

The network node 3 may be configured to perform the above steps e.g. by comprising one or more processors 20 (or processing circuitry) and memory 11, the memory 11 containing instructions executable by the processor 10, whereby the network node 3 is operative to perform the steps. That is, in an embodiment, a network node 3 is provided for handover of a communication device. The network node 3 comprises one or more processors 10 and memory 11, the memory 11 containing instructions executable by the processor 10, whereby the network node 3 is operative to: calculate a phase noise value between one or more layers received in each element $18_1, \ldots, 18_i, \ldots, 18_N$ from a first transmitter node 2a and one or more layers received in each element $18_1, \ldots, 18_i, \ldots, 18_N$ from a second transmitter node 2b, and to determine a scheduling allocation for the at least two transmitter nodes 2a, 2b, taking the calculated phase noise value into account.

In an embodiment, the network node 3 is configured to:
allocate transmission resources for the at least two transmitter nodes 2a, 2b according to the determined scheduling allocation, and
transmit a message to the at least two transmitter node 2a, 2b, the message indicating the allocated transmission resources.

In various embodiments, the network node 3 is configured to change, based on the determining, a set of scheduling grants by changing one or more of: modulation and coding scheme, resource allocation, rank and precoder.

In various embodiments, the network node 3 is configured to calculate a phase noise value as part of a signal-to-noise interference, SNR, calculation, the SNR calculation comprising:

$$SNR_k = \frac{E\{r_k r_k^H\}}{E\{(Sw_k)^H Sw_k\} - E\{r_k r_k^H\} + E\{(S\varphi_{w_k})^H S\varphi_{w_k}\} + w_k^T w_k \frac{\sigma^2}{N}},$$

wherein $r_k$ is the received symbol of layer k, S is a matrix of received layers, $w_k$ is a set of combining weights for layer k, N is the number of elements used for reception.

In various embodiments, the distributed local oscillator architecture comprises N local oscillators, and the phase noise value comprises phase noise attributed to uncorrelated or partly uncorrelated phase noise contributions of the N local oscillators.

In various embodiments, the network node 3 is configured to, before the calculating, receive scheduling requests from the at least two transmitter nodes 2a, 2b.

In various embodiments, the network node 3 is configured to determine the scheduling allocation when scheduling two transmitter nodes 2a, 2b for which a difference in received signal strengths (in dB) exceeds a defined first threshold value.

In various embodiments, the network node 3 is configured to schedule the two transmitter nodes 2a, 2b for which a difference in received signal strengths exceeds the defined first threshold value, in different frequency resources or in different time resources.

In various embodiments, the network node 3 is configured to determine the scheduling allocation when scheduling two transmitter nodes 2a, 2b for which a difference in received signal strengths is less than a defined second threshold value, and configured to schedule the two transmitter nodes 2a, 2b in same time and frequency resource, with different spatial precoders.

Figure 5:
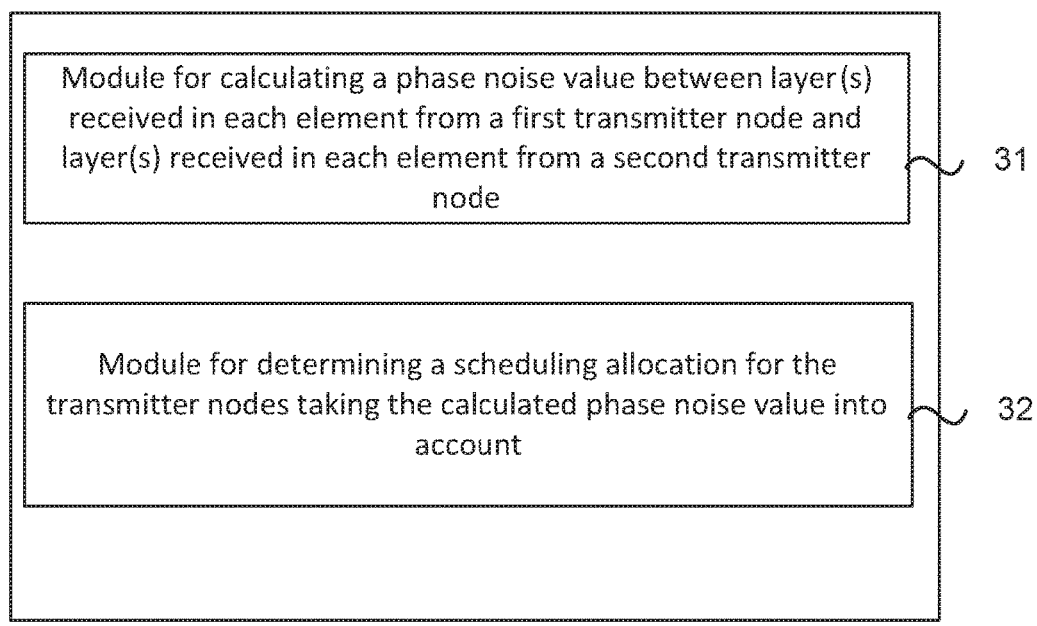
FIG. 5 illustrates a network node comprising function modules/software modules for implementing embodiments of the present teachings.

FIG. 5 illustrates a network node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

The network node 3 comprises a first module 31 for calculating a phase noise value between one or more layers received in each element from a first transmitter node and one or more layers received in each element from a second transmitter node. Such first module 31 may, for instance, comprise processing circuitry adapted to perform such calculation.

The network node 3 comprises a second module 32 for determining a scheduling allocation for the at least two transmitter nodes, taking the calculated phase noise value into account. Such second module 32 may, for instance, comprise processing circuitry adapted to perform such determination.

It is noted that one or both of the modules 31, 32 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method, performed by a network node, of scheduling, the network node comprising a distributed local oscillator architecture in which elements of an antenna array have at least partly uncorrelated local oscillator signals, the network node having wireless connectivity to at least two transmitter nodes, the method comprising:
    calculating a phase noise value between one or more layers received in each element from a first transmitter node and one or more layers received in each element from a second transmitter node;
    determining an uplink scheduling allocation for the at least two transmitter nodes based on the calculated phase noise value;
    allocating transmission resources for the at least two transmitter nodes according to the determined uplink scheduling allocation; and
    transmitting a message to the at least two transmitter nodes, the message indicating the allocated transmission resources.

2. The method of claim 1, further comprising changing, based on the determining, a set of scheduling grants by changing one or more of: a modulation and coding scheme, resource allocation, a rank, and a precoder.

3. The method of claim 1, wherein the calculating the phase noise comprises calculating the phase noise value as part of a signal-to-noise interference (SNR) calculation, the SNR calculation comprising:

$$SNR_k = \frac{E\{r_k r_k^H\}}{E\{(Sw_k)^H Sw_k\} - E\{r_k r_k^H\} + E\{(S\varphi_{w_k})^H S\varphi_{w_k}\} + w_k^T w_k \frac{\sigma^2}{N}}$$

where $r_k$ is the received symbol of layer k, S is a matrix of received layers, $w_k$ is a set of combining weights for layer k, N is the number of elements used for reception.

4. The method of claim 1, wherein the distributed local oscillator architecture comprises N local oscillators, and the phase noise value comprises phase noise attributed to at least partly uncorrelated phase noise contributions of the N local oscillators.

5. The method of claim 1, further comprising, prior to the calculating, receiving scheduling requests from the at least two transmitter nodes.

6. The method of claim 1, wherein the determining the uplink scheduling allocation is performed when a difference in received signal strengths for the two transmitter nodes exceeds a defined first threshold value.

7. The method of claim 6, further comprising scheduling the two transmitter nodes in different frequency resources or in different time resources.

8. The method of claim 1:
wherein the determining the uplink scheduling allocation is performed when a difference in received signal strengths for the two transmitter nodes is less than a defined second threshold value; and
further comprising scheduling the two transmitter nodes in same time and frequency resource, with different spatial precoders.

9. A non-transitory computer readable recording medium storing a computer program product for scheduling by a network node, the network node comprising a distributed local oscillator architecture in which elements of an antenna array have at least partly uncorrelated local oscillator signals, the network node having wireless connectivity to at least two transmitter nodes, the computer program product comprising software instructions which, when run on processing circuitry of the network node, causes the network node to:
calculate a phase noise value between one or more layers received in each element from a first transmitter node and one or more layers received in each element from a second transmitter node;
determine an uplink scheduling allocation for the at least two transmitter nodes based on the calculated phase noise value;
allocate transmission resources for the at least two transmitter nodes according to the determined uplink scheduling allocation; and
transmit a message to the at least two transmitter nodes, the message indicating the allocated transmission resources.

10. A network node configured for wireless connectivity to at least two transmitter nodes, the network node comprising
a distributed local oscillator architecture in which elements of an antenna array use uncorrelated local oscillator signals;
processing circuitry;
memory containing instructions executable by the processing circuitry whereby the network node is operative to:
calculate a phase noise value between one or more layers received in each element from a first transmitter node and one or more layers received in each element from a second transmitter node;
determine an uplink scheduling allocation for the at least two transmitter nodes based on the calculated phase noise value into account;
allocate transmission resources for the at least two transmitter nodes according to the determined uplink scheduling allocation; and
transmit a message to the at least two transmitter nodes, the message indicating the allocated transmission resources.

11. The network node of claim 10, wherein the instructions are such that the network node is configured to change, based on the determining, a set of scheduling grants by changing one or more of: a modulation and coding scheme, resource allocation, a rank, and a precoder.

12. The network node of claim 10, wherein the instructions are such that the network node is configured to calculate the phase noise value as part of a signal-to-noise interference (SNR) calculation, the SNR calculation comprising:

$$SNR_k = \frac{E\{r_k r_k^H\}}{E\{(Sw_k)^H Sw_k\} - E\{r_k r_k^H\} + E\{(S\varphi_{w_k})^H S\varphi_{w_k}\} + w_k^T w_k \frac{\sigma^2}{N}}$$

where $r_k$ is the received symbol of layer k, S is a matrix of received layers, $w_k$ is a set of combining weights for layer k, N is the number of elements used for reception.

13. The network node of claim 10, wherein the distributed local oscillator architecture comprises N local oscillators, and the phase noise value comprises phase noise attributed to at least uncorrelated phase noise contributions of the N local oscillators.

14. The network node of claim 10, wherein the instructions are such that the network node is configured to, prior to the calculating, receive scheduling requests from the at least two transmitter nodes.

15. The network node of claim 10, wherein the instructions are such that the network node is configured to determine the uplink scheduling allocation when scheduling two transmitter nodes for which a difference in received signal strengths exceeds a defined first threshold value.

16. The network node of claim 15, wherein the instructions are such that the network node is configured to schedule the two transmitter nodes in different frequency resources or in different time resources.

17. The network node of claim 10, wherein the instructions are such that the network node is configured to:
determine the uplink scheduling allocation when scheduling two transmitter nodes for which a difference in received signal strengths is less than a defined second threshold value; and
schedule the two transmitter nodes in same time and frequency resource, with different spatial precoders.

* * * * *